(12) United States Patent
Yoshida

(10) Patent No.: US 6,188,844 B1
(45) Date of Patent: Feb. 13, 2001

(54) RANGEFINDER APPARATUS

(75) Inventor: Hideo Yoshida, Saitama (JP)

(73) Assignee: Fuji Photo Optical Co., Ltd., Omiya (JP)

( * ) Notice: Under 35 U.S.C. 154(b), the term of this patent shall be extended for 0 days.

(21) Appl. No.: 09/413,238

(22) Filed: Oct. 7, 1999

(30) Foreign Application Priority Data

Oct. 8, 1998 (JP) .................................................. 10-287025

(51) Int. Cl.$^7$ .............................. G03B 13/36; G01C 3/08
(52) U.S. Cl. .......................................... 396/106; 356/3.04
(58) Field of Search .................................... 396/106, 120; 356/3.04, 3.05

(56) References Cited

U.S. PATENT DOCUMENTS

| | | | |
|---|---|---|---|
| 5,659,387 | 8/1997 | Yoshida | 356/4.01 |
| 6,026,246 * | 2/2000 | Yoshida et al. | 396/106 |

FOREIGN PATENT DOCUMENTS 7-181038   7/1995   (JP) .

* cited by examiner

*Primary Examiner*—W. B. Perkey
(74) *Attorney, Agent, or Firm*—Leydig, Voit & Mayer, Ltd.

(57) ABSTRACT

In a rangefinder apparatus where the external light luminance is relatively high, the period of each accumulating operation in an integrating circuit, the light-emitting period of an infrared emitting diode (IRED), and the light-emitting interval of the IRED are set to 26 microseconds, 52 microseconds, and 360 microseconds, respectively, and the number of accumulating operations is set to 328. When the external light luminance is relatively low, the accumulating period, the light-emitting period, and the light-emitting interval of the IRED are set to 50 microseconds, 76 microseconds, and 526 microseconds, respectively, and the number of accumulating operations is set to 170; and further the accumulating period, the light-emitting period, and the light-emitting interval are set to 28 microseconds, 54 microseconds, and 374 microseconds, respectively, and the number of accumulating operations is set to 1. Consequently, the respective integration times in both cases become identically 8528 microseconds.

10 Claims, 7 Drawing Sheets

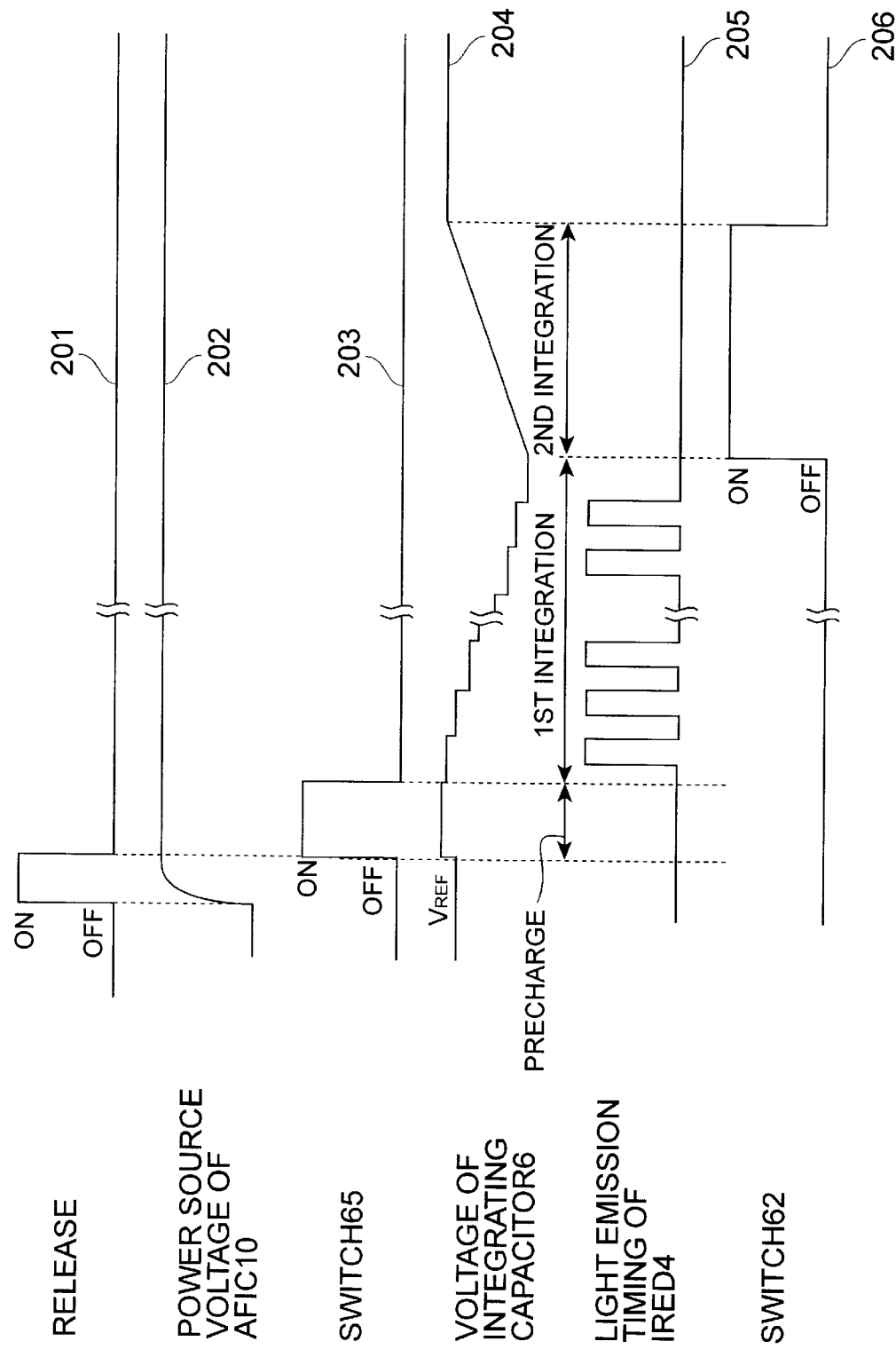

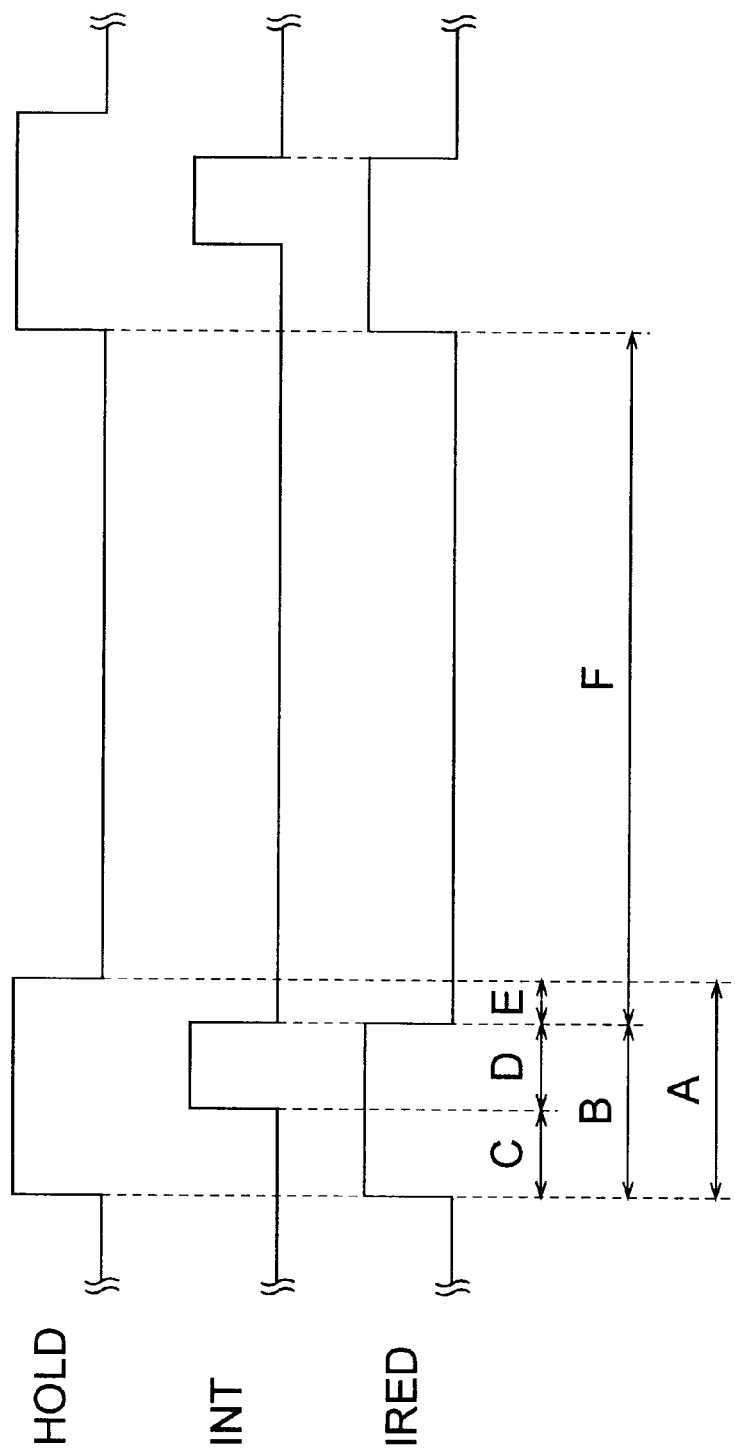

RANGERFINDER APPARATUS

BACKGROUND OF THE INVENTION

1. Field of the Invention

The present invention relates to a rangefinder apparatus for measuring the distance to an object to be measured; and, in particular, to an active type rangefinder apparatus suitably used in a camera or the like.

2. Related Background Art

In active type rangefinder apparatus used in cameras and the like, an infrared light-emitting diode (IRED) projects a luminous flux toward an object to be measured, the reflected light of thus projected luminous flux is received by a position sensitive detector (PSD), a signal outputted from the PSD is arithmetically processed by a signal processing circuit and an arithmetic circuit and then is outputted as distance information, and the distance to the object is detected by a CPU. In general, since errors may occur when the distance is measured upon a single light-projecting operation, light is projected a plurality of times so as to obtain a plurality of distance information items, which are then accumulated at predetermined intervals by an integrating circuit so as to be integrated and averaged.

In such a rangefinder apparatus, it is preferred that the period of each accumulating operation and the number of accumulating operations in the integrating circuit be set to values corresponding to the external light luminance. Namely, from the viewpoint of improving the accuracy in distance measurement, it is preferable that the period of each accumulating period be elongated when the external light luminance is lower than when it is higher.

SUMMARY OF THE INVENTION

However, the period of each accumulating operation set by the CPU is limited to integral multiples of a predetermined time (e.g., 2 microseconds) and cannot be set to an arbitrary time. Therefore, if the period of each accumulating operation and the number of accumulating operations in the integrating circuit are set to values corresponding to the external light luminance, then the integration time (=period of each accumulating operation×number of accumulating operations) may vary depending on the external light luminance. Hence, for accurately computing the measured distance value from the result of integration, it is necessary to carry out the computation in conformity with different converting expressions depending on the integration time. In this case, since a plurality of converting expressions are needed, the program in the CPU increases its size, whereby storage means such as electrically erasable and programmable read-only memory (EEPROM) and the like necessitate a larger storage capacity.

In order to overcome the problem mentioned above, it is an object of the present invention to provide a rangefinder apparatus which can compute the measured distance value from the result of integration according to a single converting expression even when the period of each accumulating operation and the number of accumulating operations in the integrating circuit are changed.

A first rangefinder apparatus in accordance with the present invention comprises: (1) light-projecting means for projecting a luminous flux toward an object to be measured; (2) light-receiving means for receiving reflected light of the luminous flux projected to the object at a light-receiving position on a position sensitive detector corresponding to a distance to the object, and outputting a signal corresponding to the light-receiving position; (3) arithmetic means for carrying out an arithmetic operation according to the signal outputted from the light-receiving means, so as to output an output ratio signal corresponding to the distance to the object; (4) integrating means for accumulating and integrating the output ratio signal, so as to output an integrated signal corresponding to the result of integration; (5) adjusting means for adjusting a period of each accumulating operation and the number of accumulating operations in the integrating means such that an integration time which is the sum of respective periods of the accumulating operations becomes a constant value; and (6) detecting means for detecting the distance to the object according to the integrated signal outputted from the integrating means.

In this rangefinder apparatus, a luminous flux is outputted from the light-projecting means toward the object to be measured, and is reflected by the object. The light-receiving means receives the reflected light at a light-receiving position on the position sensitive detector corresponding to the distance to the object, and outputs a signal corresponding to the light-receiving position. The arithmetic means arithmetically operates the signal outputted from the light-receiving means, and outputs an output ratio signal corresponding to the distance to the object. The integrating means accumulates and integrates the output ratio signal outputted from the arithmetic means, and outputs an integrated signal corresponding to the result of integration. According to the integrated signal outputted from the integrating means, the detecting means detects the distance to the object. Here, even when the period of each accumulating operation and the number of accumulating operations in the integrating means are changed according to the external light luminance, for example, they are adjusted by the adjusting means such that the integration time, which is the sum of respective periods of the accumulating operations, becomes a constant value. As a consequence, the distance to the object is detected by the detecting means in conformity with a single converting expression. In this rangefinder apparatus, it is preferred that, when adjusting the period of each accumulating operation so as to make it longer than a predetermined time, the adjusting means adjust the period of an accumulating operation within a range not shorter than the predetermined time, such that the integration time in the integrating means becomes the above-mentioned constant value.

A second rangefinder apparatus in accordance with the present invention comprises: (1) light-projecting means for projecting a luminous flux toward an object to be measured; (2) light-receiving means for receiving reflected light of the luminous flux projected to the object at a light-receiving position on a position sensitive detector corresponding to a distance to the object, and outputting a signal corresponding to the light-receiving position; (3) arithmetic means for carrying out an arithmetic operation according to the signal outputted from the light-receiving means, so as to output an output ratio signal corresponding to the distance to the object; (4) integrating means for accumulating and integrating the output ratio signal, so as to output an integrated signal corresponding to the result of integration; (5) adjusting means for adjusting a period of each accumulating operation and the number of accumulating operations in the integrating means such that an integration time which is the sum of respective periods of the accumulating operations lies within a constant range including a predetermined value; and (6) detecting means for detecting the distance to the object according to the integrated signal outputted from the integrating means in conformity with a converting expression for a case where the integration time in the integrating means is at the predetermined value.

This rangefinder apparatus operates substantially similarly to the first rangefinder apparatus except for the following points. Namely, in this rangefinder apparatus, even when the period of each accumulating operation and the number of accumulating operations in the integrating means are changed according to the external light luminance, for example, they are adjusted by the adjusting means such that the integration time, which is the sum of respective periods of the accumulating operations, lies within a constant range including a predetermined value. Then, for detecting the distance to the object in the detecting means, a converting expression for the case where the integration time is at the predetermined value is used. Preferably, in this rangefinder apparatus, the adjusting means adjusts the integration time in the integrating means to one of a plurality of values and employs an average value of the plurality of values as the predetermined value.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 3 is a timing chart for explaining operations of the rangefinder apparatus in accordance with the first embodiment;

FIG. 4 is a timing chart for explaining timings of control signals at the time of first integration in the rangefinder apparatus in accordance with the first embodiment;

DETAILED DESCRIPTION OF THE PREFERRED EMBODIMENTS

In the following, embodiments of the present invention will be explained in detail with reference to the accompanying drawings. Here, in the explanation of the drawings, constituents identical to each other will be referred to with letters or numerals identical to each other, without their overlapping descriptions being repeated. Also, the following explanation relates to cases where active type rangefinder apparatus in accordance with these embodiments are employed as a rangefinder apparatus of an autofocus type camera.

First Embodiment

Figure 1:
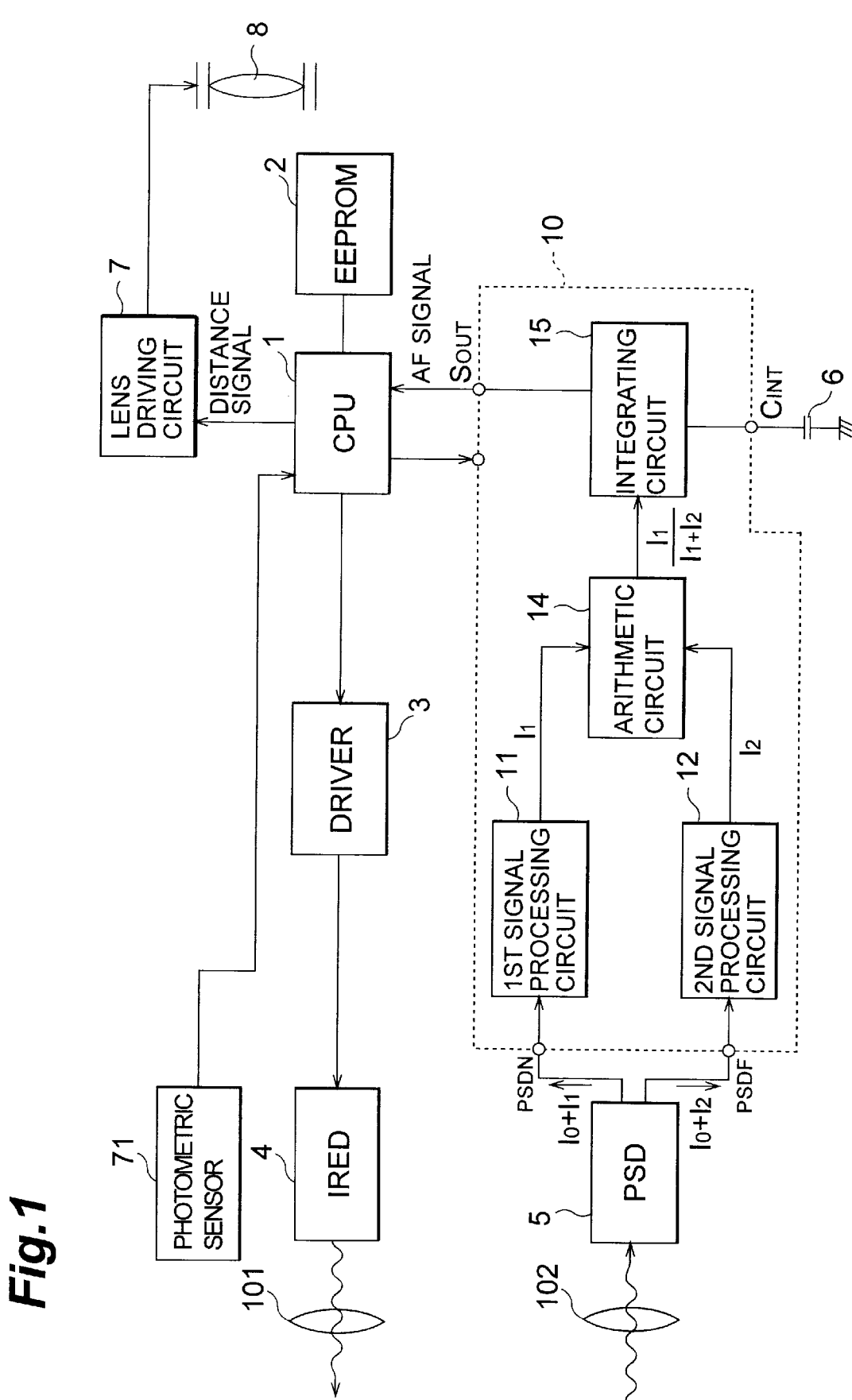
FIG. 1 is a configurational view of the rangefinder apparatus in accordance with a first embodiment of the present invention.

First, the overall configuration of the rangefinder apparatus in accordance with the first embodiment will be explained. FIG. 1 is a configurational view of the rangefinder apparatus in accordance with this embodiment.

A CPU 1 is used for controlling the whole camera equipped with this rangefinder apparatus, and controls the whole camera including the rangefinder apparatus according to a program and parameters prestored in an EEPROM 2. In the rangefinder apparatus shown in this drawing, the CPU 1 regulates a driver 3, so as to control the emission of infrared light from an IRED (infrared light-emitting diode) 4. Also, the CPU 1 controls actions of an autofocus IC (AFIC) 10, and inputs the AF signal outputted from the AFIC 10. Further, the CPU 1 inputs the value of external light luminance measured by a photometric sensor 71.

By way of a light-projecting lens 101 disposed at the front face of the IRED 4, the infrared light emitted from the IRED 4 is projected onto the object to be measured. The infrared light is partly reflected by the object, and the resulting reflected light is received, by way of a light-receiving lens 102 disposed at the front face of a PSD (position sensitive detector) 5, at a position on the light-receiving surface of the PSD 5. This light-receiving position corresponds to the distance to the object. Then, the PSD 5 outputs two signals $I_1$ and $I_2$ which correspond to the light-receiving position. The signal $I_1$ is a near-side signal which has a greater value as the distance is shorter if the quantity of received light is constant, whereas the signal $I_2$ is a far-side signal which has a greater value as the distance is longer if the quantity of received light is constant. The sum of the signals $I_1$ and $I_2$ represents the quantity of reflected light received by the PSD 5, whereas the output ratio ($I_1/(I_1+I_2)$) represents the light-receiving position on the light-receiving surface of the PSD 5, i.e., the distance to the object. The near-side signal $I_1$ is inputted to the PSDN terminal of the AFIC 10, whereas the far-side signal $I_2$ is inputted to the PSDF terminal of the AFIC 10. In practice, however, depending on external conditions, there are cases where respective signals in which a steady-state light component $I_0$ is added to the near-side signal $I_1$ and far-side signal $I_2$ are fed into the AFIC 10.

The AFIC 10 is an integrated circuit (IC) constituted by a first signal processing circuit 11, a second signal processing circuit 12, an arithmetic circuit 14, and an integrating circuit 15. The first signal processing circuit 11 inputs therein a signal $I_1+I_0$ outputted from the PSD 5, and eliminates the steady-state light component $I_0$ therefrom, thereby outputting the near-side signal $I_1$; whereas the second signal processing circuit 12 inputs therein a signal $I_2+I_0$ outputted from the PSD 5, and eliminates the steady-state light component $I_0$ therefrom, thereby outputting the far-side signal $I_2$.

The arithmetic circuit 14 inputs therein the near-side signal $I_1$ outputted from the first signal processing circuit 11 and the far-side signal $I_2$ outputted from the second signal processing circuit 12, calculates the output ratio ($I_1/(I_1+I_2)$), and outputs an output ratio signal representing the result thereof. The integrating circuit inputs therein the output ratio signal and, together with an integrating capacitor 6 connected to the $C_{INT}$ terminal of the AFIC 10, integrates the output ratio by accumulating it a plurality of times, thereby improving the S/N ratio. Thus accumulated output ratio, i.e., the result of integration, is outputted from the $S_{OUT}$ terminal of the AFIC 10 as the AF signal. The CPU 1 inputs therein the AF signal outputted from the AFIC 10, converts the AF signal into a distance signal by carrying out a predetermined arithmetic operation, and sends out the resulting distance signal to a lens driving circuit 7. According to this distance signal, the lens driving circuit 7 causes a taking lens 8 to effect a focusing action.

Figure 2:
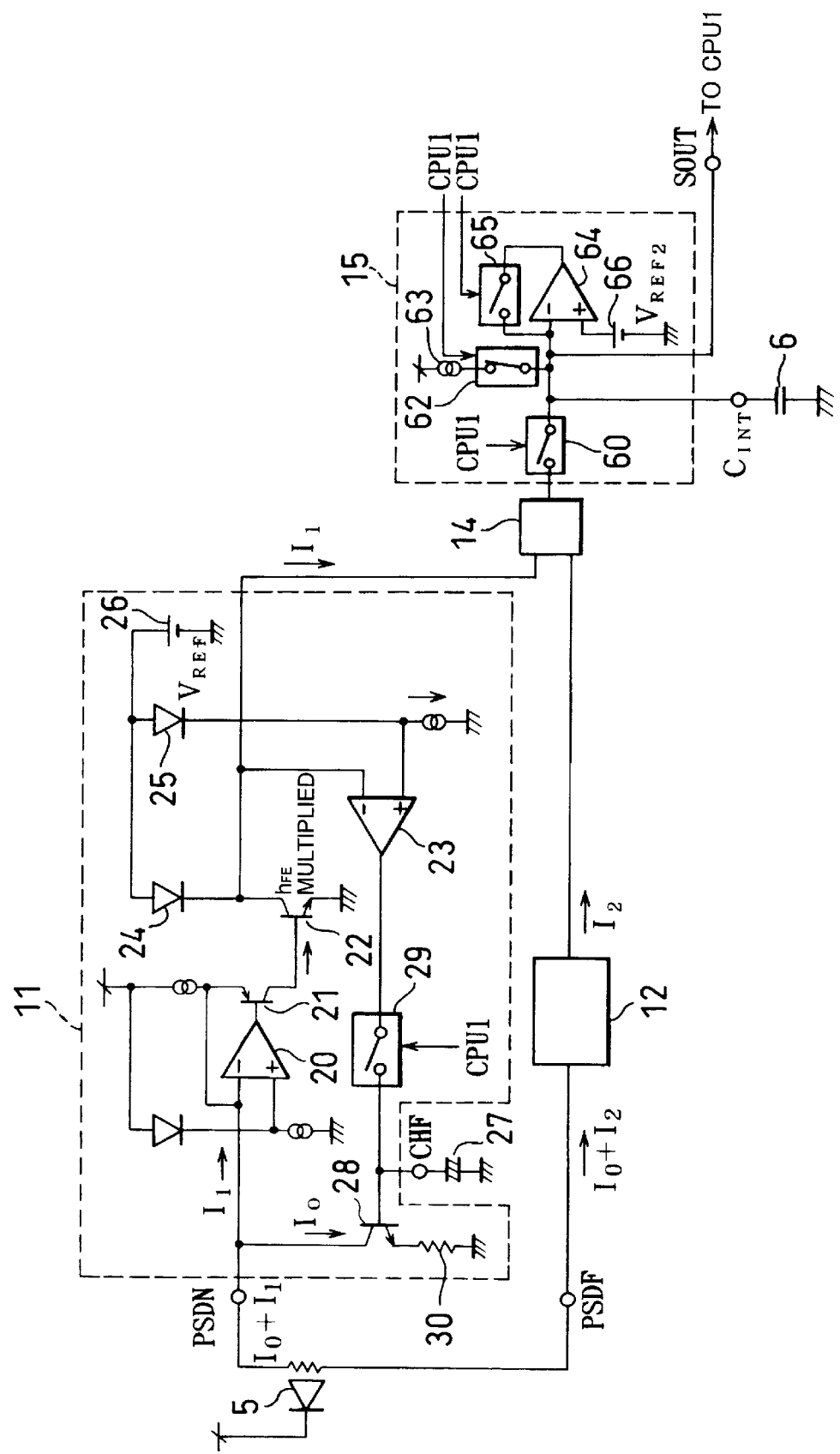
FIG. 2 is a circuit diagram of the first signal processing circuit and integrating circuit in the rangefinder apparatus in accordance with the first embodiment.

More specific respective circuit configurations of the first signal processing circuit 11 and integrating circuit 15 in the AFIC 10 will now be explained. FIG. 2 is a circuit diagram of the first signal processing circuit 11 and integrating circuit 15 in the rangefinder apparatus in accordance with this embodiment. Here, the second signal processing circuit 12 has a circuit configuration similar to that of the first signal processing circuit 11.

The first signal processing circuit 11 inputs therein the near-side signal $I_1$ with the steady-state light component $I_0$ outputted from the PSD 5, eliminates the steady-state light component $I_0$, and outputs the near-side signal $I_1$. The current ($I_1+I_0$) outputted from the near-distance-side terminal of the PSD 5 is fed to the "−" input terminal of an operational amplifier 20 in the first signal processing circuit 11 by way of the PSDN terminal of the AFIC 10. The output terminal of the operational amplifier 20 is connected to the base terminal of a transistor 21, whereas the collector terminal of the transistor 21 is connected to the base terminal of a transistor 22. The collector terminal of the transistor 22 is connected to the "−" input terminal of an operational amplifier 23 and also to the arithmetic circuit 14. Further, the cathode terminal of a compression diode 24 is connected to the collector terminal of the transistor 22, whereas the cathode terminal of a compression diode 25 is connected to the "+" input terminal of the operational amplifier 23. A first reference power source 26 is connected to the respective anode terminals of the compression diodes 24 and 25.

Also, a steady-state light eliminating capacitor 27 is externally attached to the CHF terminal of the AFIC 10, and is connected to the base terminal of a steady-state light eliminating transistor 28 within the first signal processing circuit 11. The steady-state light eliminating capacitor 27 and the operational amplifier 23 are connected to each other by way of a switch 29, whose ON/OFF is controlled by the CPU 1. The collector terminal of the steady-state light eliminating transistor 28 is connected to the "−" input terminal of the operational amplifier 20, whereas the emitter terminal of the transistor 28 is grounded by way of a resistor 30.

The integrating circuit 15 has the following configuration. The integrating capacitor 6 externally attached to the $C_{INT}$ terminal of the AFIC 10 is connected to the output terminal of the arithmetic circuit 14 by way of a switch 60, to a constant current source 63 by way of a switch 62, to the output terminal of an operational amplifier 64 by way of a switch 65, and directly to the "−" input terminal of the operational amplifier 64, whereas the potential thereof is outputted from the $S_{OUT}$ terminal of the AFIC 10. The switches 60, 62, and 65 are controlled by control signals from the CPU 1. Also, a second reference power source 66 is connected to the "+" input terminal of the operational amplifier 64.

The outline of operations of thus configured AFIC 10 will now be explained with reference to FIGS. 1 and 2. When not causing the IRED 4 to emit light, the CPU 1 keeps the switch 29 of the first signal processing circuit 11 in its ON state. The steady-state light component $I_0$ outputted from the PSD 5 at this time is inputted to the first signal processing circuit 11, and is amplified as a current by the current amplifier constituted by the operational amplifier 20 and the transistors 21 and 22. Thus amplified signal is logarithmically compressed by the compression diode 24, so as to be converted into a voltage signal, which is then fed to the "−" input terminal of the operational amplifier 23. When the signal inputted to the operational amplifier 20 is higher, the cathode potential of the compression diode 24 becomes higher, thus increasing the signal outputted from the operational amplifier 23, whereby the steady-state light eliminating capacitor 27 is charged. As a consequence, a base current is supplied to the transistor 28, so that a collector current flows into the transistor 28, whereby, of the signal $I_1$ fed into the first signal processing circuit 11, the signal inputted to the operational amplifier 20 decreases. In the state where the operation of this closed loop is stable, all of the signal $I_0$ inputted to the first signal processing circuit 11 flows into the transistor 28, whereby the charge corresponding to the base current at this time is stored in the steady-state light eliminating capacitor 27.

When the CPU 1 turns OFF the switch 29 while causing the IRED 4 to emit light, of the signal $I_1+I_0$ outputted from the PSD 5 at this time, the steady-state light component $I_1$ flows as the collector current into the transistor 28 to which the base potential is applied by the charge stored in the steady-state light eliminating capacitor 27, whereas the near-side signal $I_1$ is amplified as a current by the current amplifier constituted by the operational amplifier 20 and the transistors 21 and 22 and then is logarithmically compressed by the compression diode 24, so as to be converted into and outputted as a voltage signal. Namely, from the first signal processing circuit 11, the near-side signal $I_1$ is outputted alone after the steady-state light component $I_0$ is eliminated, and thus outputted near-side signal $I_1$ is inputted to the arithmetic circuit 14. From the second signal processing circuit 12, on the other hand, as with the first signal processing circuit 11, the far-side signal $I_2$ is outputted alone after the steady-state light component $I_0$ is eliminated, and thus outputted far-side signal $I_2$ is inputted to the arithmetic circuit 14.

The near-side signal $I_1$ outputted from the first signal processing circuit 11 and the far-side signal $I_2$ outputted from the second signal processing circuit 12 are inputted to the arithmetic circuit 14, and the output ratio $(I_1/(I_1+I_2))$ is calculated by the arithmetic circuit 14 and is outputted to the integrating circuit 15. While the IRED 4 is emitting a predetermined number of pulses of light, the switch 60 of the integrating circuit 15 is kept in its ON state, whereas the switches 62 and 65 are turned OFF, whereby the output ratio signal outputted from the integrating circuit 14 is stored in the integrating capacitor 6. When a predetermined number of pulse light emissions are completed, then the switch 60 is turned OFF, whereas the switch 65 is turned ON, whereby the charge stored in the integrating capacitor 6 is reduced by the charge having an opposite potential supplied from the output terminal of the operational amplifier 64. The CPU 1 monitors the potential of the integrating capacitor 6, so as to measure the time required for regaining the original potential, and determines the AF signal according to thus measured time, thereby determining the distance to the object.

Operations of the rangefinder apparatus in accordance with this embodiment will now be explained. FIG. 3 is a timing chart for explaining the operations of the rangefinder apparatus in accordance with this embodiment.

When the release button of the camera is half-pushed, so as to initiate a distance measuring state, a power source voltage supply is resumed in the AFIC 10, and the switch 65 is turned ON, whereby the integrating capacitor 6 is preliminarily charged until it attains a reference voltage $V_{REF}$. Also, the CPU 1 inputs therein the external light luminance measured by the photometric sensor 71.

After the completion of preliminary charging, the switch 65 is turned OFF. After the preliminary charging, the IRED 4 is driven by a light emission timing signal with a duty cycle outputted from the CPU 1 to the driver 3, as indicated by the line 205 of FIG. 3, so as to emit infrared light in a pulsing fashion. Here, the period of each light emission and the number of light emissions in the IRED 4 are determined by the CPU 1 according to the external light luminance. The infrared light emitted from the IRED 4 is reflected by the object to be measured, and thus reflected light is received by the PSD 5. The arithmetic circuit 14 outputs data of the output ratio $I_1/(I_1+I_2)$ for each light emission, and the integrating circuit 15 inputs therein these data as a distance information signal. The CPU 1 controls the switch 60 at a timing corresponding to each pulse light emission of the IRED 4, thereby inputting a negative voltage corresponding to the output ratio into the integrating capacitor 6.

The integrating capacitor 6 of the integrating circuit 15 inputs therein the distance information signal outputted from the arithmetic circuit 14, and is discharged by a voltage value corresponding to the value of the distance information signal. The discharging period (period of accumulation) is determined by the CPU 1 according to the external light luminance. As indicated by the line 204 of FIG. 3, the voltage of the integrating capacitor 6 decreases stepwise (first integration) every time the distance information signal is inputted. While the amount of voltage drop for each step is distance information per se, the sum of amounts of voltage drop obtained by individual pulse emissions of the IRED 4 is employed as distance information in this embodiment.

After the input to the integrating capacitor 6 by a predetermined number of light emissions is completed, the switch 60 is held in its OFF state, and the switch 62 is turned ON by a signal from the CPU 1. As a consequence, the integrating capacitor 6 is charged at a predetermined rate determined by the rating of the constant current source 63 (second integration).

During the period of this second integration, the voltage of the integrating capacitor 6 and the reference voltage $V_{REF}$ are compared with each other in terms of magnitude. If it is determined that they coincide with each other, then the switch 62 is turned OFF, so as to stop charging the integrating capacitor 6. Then, the CPU 1 measures the time required for the second integration. Since the charging speed due to the constant current source 63 is constant, the AF signal can be determined from the time required for the second integration, whereby the sum of the distance information signals inputted to the integrating capacitor 6 upon one distance measuring operation, i.e., the distance to the object to be measured, can be determined.

Thereafter, when the release button is completely pushed, the CPU 1 controls the lens driving circuit 7 according to thus determined distance, so as to cause the taking lens 8 to carry out an appropriate focusing action, and further performs exposure by opening the shutter (not depicted). Thus, upon a release operation, a series of photographing actions comprising preliminary charging, distance measurement (first integration and second integration), focusing, and exposure is carried out. Its subsequent photographing operations are similar thereto.

Here, in the first integrating action of the rangefinder apparatus, the light emission timing in the IRED 4 is controlled by the IRED signal outputted from the CPU 1. The timing of discharging in the integrating capacitor 6 (opening/closing of the switch 60) is controlled by the INT signal outputted from the CPU 1. The timing of storing and holding of the steady-state light component in the steady-state light eliminating capacitor 27 (opening/closing of the switch 29) is controlled by the HOLD signal outputted from the CPU 1. Therefore, the timings of control signals at the time of the first integration will now be explained schematically. FIG. 4 is a timing chart for explaining the timings of control signals at the time of the first integration in the rangefinder apparatus in accordance with this embodiment.

Each of the HOLD signal and INT signal shown in this chart is a control signal supplied from the CPU 1 to the AFIC 10. The control functions of the HOLD signal and INT signal are as follows. From the time when the resetting is cleared (at the falling edge of the RESET signal) until the initial rising edge of the INT signal, the integrating capacitor 6 is preliminarily charged with the reference voltage $V_{REF}$. From the first rising edge of the INT signal after clearing the resetting until the falling edge thereof, the steady-state light eliminating capacitor 27 is preliminarily charged. After clearing the resetting, during the period when the HOLD signal is at its HIGH level, the steady-state light component is held by the steady-state light eliminating capacitor 27. After clearing the resetting, during the period when the HOLD signal is at its HIGH level and the INT signal is also at its HIGH level, accumulation is carried out in the integrating capacitor 6. Also, after clearing the resetting, during the period when the HOLD signal is at its LOW level and the INT signal is at its HIGH level, second integration is carried out. On the other hand, the IRED signal is a control signal supplied from the CPU 1 to the driver 3, and controls the light emission timing of the IRED 4.

As shown in this chart, during the period A when the steady-state light component is held by the steady-state light eliminating capacitor 27 due to the HOLD signal, the IRED signal causes the IRED 4 to emit light. In the period B when the IRED 4 emits light, after the period C required for the output of each amplifier in the circuits to be stabilized has elapsed, the integrating capacitor 6 is discharged by the period D due to the INT signal. When the period E has elapsed after the completion of light emission in the IRED 4, the holding of the steady-state light component by the steady-state light eliminating capacitor 27 is terminated. The IRED 4 emits light at the interval F. In the first integration, the discharging of the integrating capacitor 6 (accumulation of output ratio signal) in the period D is carried out a plurality of times.

In this embodiment, the period D of each accumulating operation in the integrating capacitor 6 is adjusted by the CPU 1 according to the external light luminance measured by the photometric sensor 71. At this time, the period D of each accumulating operation in the integrating capacitor 6 is adjusted such that the integration time (sum of respective periods D of integrating operations) becomes a constant value. Here, the light-emitting period B of the IRED 4 includes the necessary period C in addition to the accumulating period D in the integrating capacitor 6. Also, in order for the light-emitting intensity of pulses of the IRED 4 to be kept constant, it is necessary for the duty cycle of light emission to be kept constant. As a consequence, the light-emitting interval F is determined in proportion to the light-emitting period B.

Figure 5A:
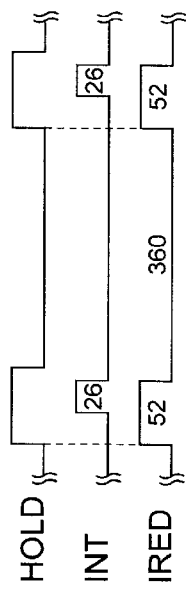
FIGS. 5A to 5C are timing charts for explaining the timings of control signals at the time of the first integration in the rangefinder apparatus in accordance with the first embodiment.
Figure 5B:
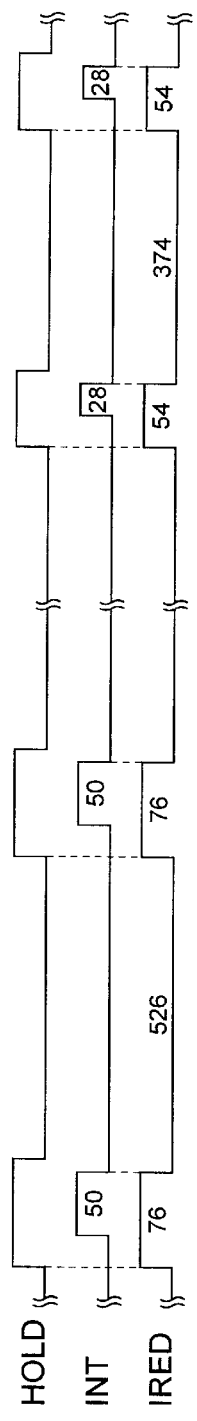
Figure 5C:
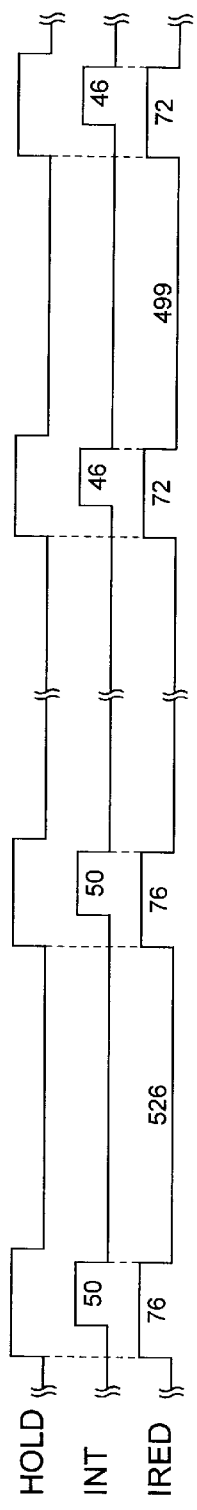

The timings of control signals at the time of the first integration will now be explained specifically. FIGS. 5A to 5C are timing charts for explaining the timings of control signals at the time of the first integration in the rangefinder apparatus in accordance with this embodiment. Each numerical value shown in the charts indicates the pulse width or pulse interval of a control signal in microseconds. Here, the period C from the starting of light emission in the IRED 4 until the starting of accumulation of the steady-state light component in the integrating capacitor 6 is set to 26 microseconds, the period E from the completion of accumulation in the integrating capacitor 6 until the completion of holding of the steady-state light component in the steady-state light eliminating capacitor 27 is set to 8 microseconds, and each of them is maintained as a constant value.

FIG. 5A is a timing chart of control signals in the case where the external light luminance measured by the photometric sensor 71 is relatively high. Here, the accumulating period D of the integrating capacitor 6, the light-emitting period B of the IRED 4, and the light-emitting interval F of the IRED 4 are set to 26 microseconds, 52 microseconds, and 360 microseconds, respectively, whereas the number of accumulating operations is set to 328. The integration time $T_1$ in this case is:

$T_1 = 26 \times 328 = 8528$ microseconds, and the distance measurement time is 135136 microseconds.

On the other hand, FIG. 5B is a timing chart of control signals in the case where the external light luminance measured by the photometric sensor 71 is relatively low. Here, the accumulating period D of the integrating capacitor 6, the light-emitting period B of the IRED 4, and the light-emitting interval F of the IRED 4 are set to 50 microseconds, 76 microseconds, and 526 microseconds, respectively, whereas the number of accumulating operations under this condition is set to 170. Also, the accumulating period D of the integrating capacitor 6, the light-emitting period B of the IRED 4, and the light-emitting interval F of the IRED 4 are set to 28 microseconds, 54 microseconds, and 374 microseconds, respectively, whereas the number of accumulating operations under this condition is set to 1. The integration time $T_2$ in this case is:

$T_2 = 50 \times 170 + 28 \times 1 = 8528$ microseconds, and the distance measurement time is 102768 microseconds. Thus, when the external light luminance is relatively low, the period D of each accumulating operation is elongated, and the period of one of accumulating operations is adjusted, such that the integration time $T_2$ coincides with the integration time $T_1$.

Also, FIG. 5C is a timing chart of control signals in the case where the external light luminance measured by the photometric sensor 71 is relatively low. Here, the accumulating period D of the integrating capacitor 6, the light-emitting period B of the IRED 4, and the light-emitting interval F of the IRED 4 are set to 50 microseconds, 76 microseconds, and 526 microseconds, respectively, whereas the number of accumulating operations under this condition is set to 154. Also, the accumulating period D of the integrating capacitor 6, the light-emitting period B of the IRED 4, and the light-emitting interval F of the IRED 4 are set to 46 microseconds, 72 microseconds, and 499 microseconds, respectively, whereas the number of accumulating operations under this condition is set to 18. The integration time $T_3$ in this case is:

$T_3 = 50 \times 154 + 46 \times 18 = 8528$ microseconds, and the distance measurement time is 102986 microseconds. Thus, when the external light luminance is relatively low, the integration time $T_3$ can be made to coincide with the integration time $T_1$ by elongating the period D of each accumulating operation and adjusting the periods of a plurality of accumulating operations as well.

Figure 6:
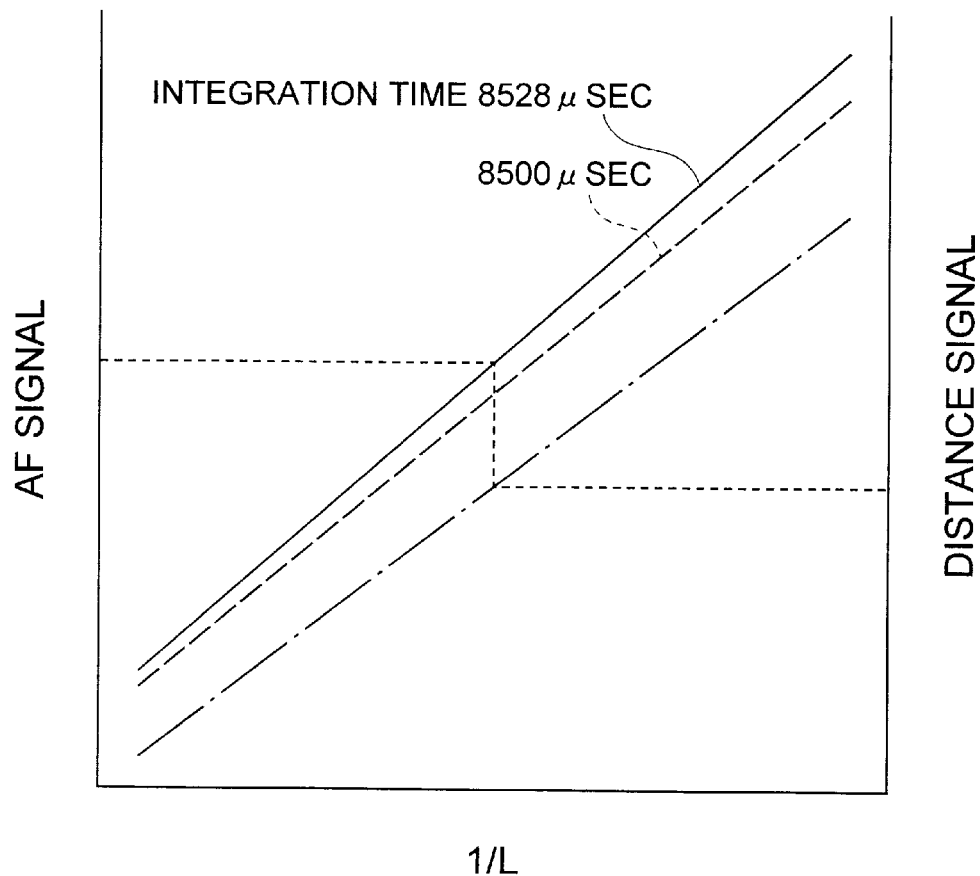
FIG. 6 is a graph for explaining a method of computing a distance signal from an AF signal which is the result of integration in the rangefinder apparatus in accordance with the first embodiment.

FIG. 6 is a graph for explaining a method of computing a distance signal from an AF signal which is the result of integration in the rangefinder apparatus in accordance with this embodiment. In this graph, the solid line indicates the relationship between the distance L to the object to be measured and the AF signal in each of the cases of FIGS. 5A to 5C, i.e., the case where the integration time is 8528 microseconds. The broken line indicates the relationship between the distance L to the object and the AF signal in the case where the accumulating period D of the integrating capacitor 6, the light-emitting period B of the IRED 4, and the light-emitting interval F of the IRED 4 are set to 50 microseconds, 76 microseconds, and 526 microseconds, respectively, whereas the number of accumulating operations under this condition is set to 170 in FIG. 5B, i.e., the case where the integration time is 8500 microseconds. Further, the chain line indicates the relationship between the distance L to the object and the distance signal.

As shown in this graph, each of the AF signal and distance signal is substantially linear to the reciprocal of the distance L, whereby the distance signal can be computed from the AF signal according to a linear converting expression. If the distance signal is to be computed accurately from the AF signal, then different converting expressions are necessary for the computation depending on the integration time. Namely, it is necessary to prepare the converting expression for the case where the integration time is 8500 microseconds and the converting expression for the case where the integration time is 8528 microseconds, separately from each other. In the rangefinder apparatus in accordance with this embodiment, however, even when the period of each accumulating operation and the number of accumulating operations in the first integration are adjusted according to the external light luminance, the integration time is always kept constant, whereby only one converting expression for converting the AF signal to the distance signal is required. As a consequence, the program in the CPU 1 would not increase its size, and the storage capacity needed for the EEPROM 2 would not enhance.

Second Embodiment

The rangefinder apparatus in accordance with the second embodiment will now be explained. The configuration and basic operations of the rangefinder apparatus in accordance with this embodiment are similar to those in the first embodiment (FIGS. 1 to 4). While the integration time is always kept constant when the period of each accumulating operation and the number of accumulating operations in the first integration are adjusted according to the external light luminance in the first embodiment; the integration time is not always kept constant in the second embodiment, namely, it is adjusted so as to lie within a constant range including a predetermined value, whereby the distance signal is computed from the AF signal in conformity with a converting expression for the case where the integration time is at the above-mentioned predetermined value. Here, the predetermined value may be the median of the constant range, or the average value of two integration times when there are only two integration times.

Figure 7:
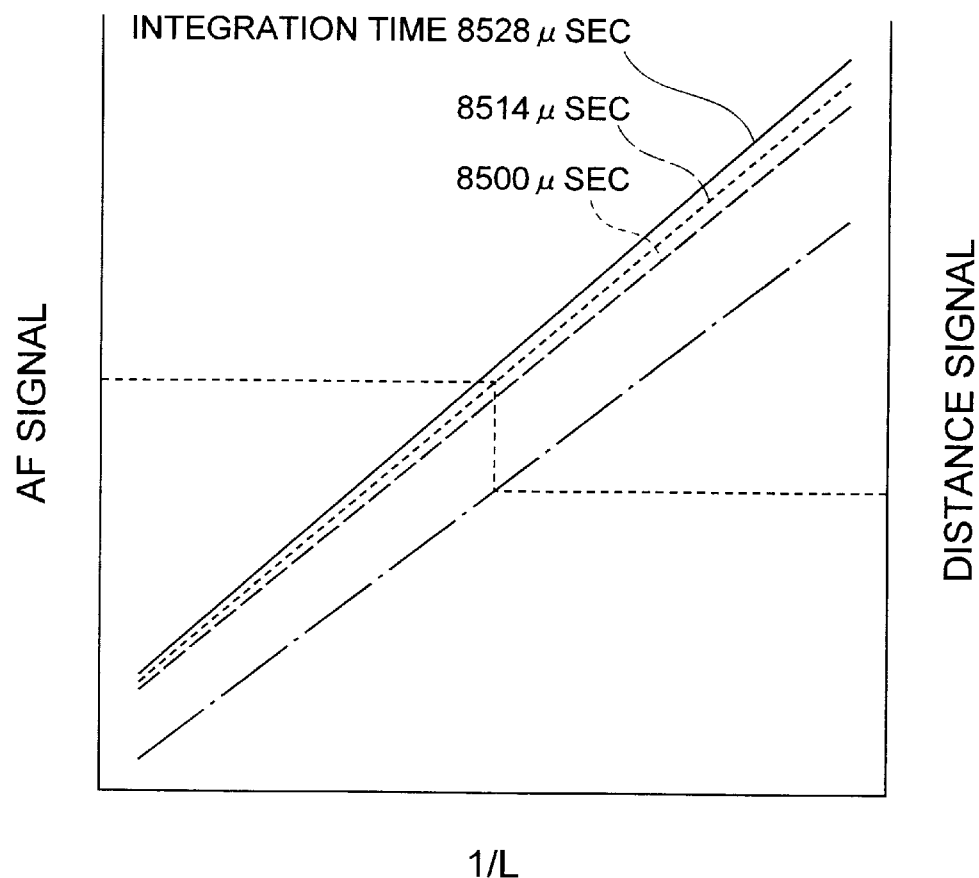
FIG. 7 is a graph for explaining a method of computing a distance signal from an AF signal which is the result of integration in the rangefinder apparatus in accordance with a second embodiment.

FIG. 7 is a graph for explaining a method of computing a distance signal from an AF signal which is the result of integration in the rangefinder apparatus in accordance with this embodiment. In this graph, the solid line indicates the relationship between the distance L to the object to be measured and the AF signal in the case of FIG. 5A, i.e., the case where the integration time is 8528 microseconds. The broken line indicates the relationship between the distance L to the object and the AF signal in the case where the accumulating period D of the integrating capacitor 6, the light-emitting period B of the IRED 4, and the light-emitting interval F of the IRED 4 are set to 50 microseconds, 76 microseconds, and 526 microseconds, respectively, whereas the number of accumulating operations under this condition is set to 170 in FIG. 5B, i.e., the case where the integration time is 8500 microseconds. Also, the dotted line between the solid line and the broken line indicates the relationship between the distance L to the object and the AF signal in the case where the integration time is 8514 microseconds (the average value between 8528 microseconds and 8500 microseconds). Further, the chain line indicates the relationship between the distance L to the object and the distance signal.

As shown in this graph, in each of the respective cases where the integration time is 8528 microseconds and 8500 microseconds, the distance signal is computed from the AF signal in conformity with the converting expression for the case where the integration time is at the average value of 8514 microseconds. Namely, only one converting expression is necessary for converting the AF signal to the distance signal. As a consequence, the program in the CPU 1 would not increase its size, and the storage capacity needed for the EEPROM 2 would not enhance in this case as well. Here, even when there are three or more integration times exist, the distance signal can be computed in conformity with the converting expression for the average value of these plurality of integration times.

Without being restricted to the above-mentioned embodiments, the present invention can be modified in various manners. For example, the present invention is also applicable to the case where the charging/discharging of the integrating circuit is the reverse of that in the above-mentioned embodiments, i.e., the integrating circuit in which a plurality of charging operations are carried out in the first integration such that the voltage of the integrating capacitor increases stepwise and then only one discharging operation is carried out in the second integration.

While the distance to the object is obtained on the basis of the time needed in the second integral, it may also be obtained on the basis of the result of the A/D conversion of the integral voltage value obtained by the first integral, namely, the voltage value which is reduced due to the discharge of integral capacitor or the voltage value which is increased due to the charge of integral capacitor.

Also, though the above-mentioned embodiments explain the cases where the period of each accumulating operation and the number of accumulating operations in the integrating circuit are changed according to the external light luminance, the present invention is also applicable to the cases where they are changed according to the temperature, power source voltage, object reflectivity, and the like.

In accordance with the present invention, as explained in detail in the foregoing, even when the period of each integrating operation and the number of accumulating operations in the integrating means are changed according to the external light luminance, for example, they are adjusted such that the integration time, which is the sum of respective periods of the accumulating operations, becomes a constant value. Alternatively, the period of each integrating operation and the number of accumulating operations in the integrating means are adjusted such that the integration time lies within a constant range including a predetermined value, and a converting expression for the case where the integration time is at the predetermined value is used for detecting the distance to the object to be measured. As a consequence, only one converting expression is used for detecting the distance to the object from the result of integration, whereby the program in the CPU would not increase its size, and the storage capacity needed for storage means such as the EEPROM and the like would not enhance.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed its:

1. A rangefinder apparatus comprising:

light-projecting means for projecting a luminous flux toward an object at a distance to be measured;

light-detecting means for detecting reflected light of the luminous flux projected toward the object at a light-detecting position on a position sensitive detector corresponding to the distance to the object, and outputting a signal corresponding to said light-detecting position;

arithmetic means for carrying out an arithmetic operation according to the signal output from said light-detecting means, and outputting an output ratio signal corresponding to the distance to the object;

integrating means for accumulating and integrating the output ratio signal, and outputting an integrated signal corresponding to integration of the output ratio signal;

adjusting means for adjusting a period of each accumulating operation and the number of accumulating operations in said integrating means such that an integration time, a sum of respective periods of the accumulating operations, is a constant value; and detecting means for detecting the distance to the object according to the integrated signal output from said integrating means.

2. The rangefinder apparatus according to claim 1, wherein said light-projecting means is an infrared light-emitting diode.

3. The rangefinder apparatus according to claim 1, wherein said light-receiving means outputs a near-side signal and a far-side signal.

4. The rangefinder apparatus according to claim 1, wherein said arithmetic means and said integrating means are part of a single autofocus integrated circuit.

5. The rangefinder apparatus according to claim 1, wherein, when said adjusting means adjusts the period of each accumulating operation to be longer than a threshold time period, said adjusting means adjusts the period of an accumulating operation within a range not shorter than the threshold time period, such that the integration time in said integrating means becomes the constant value.

6. A rangefinder apparatus comprising:

light-projecting means for projecting a luminous flux toward an object at a distance to be measured;

light-detecting means for detecting reflected light of the luminous flux projected toward the object at a light-detecting position on a position sensitive detector corresponding to the distance to the object, and outputting a signal corresponding to said light-detecting position;

arithmetic means for carrying out an arithmetic operation according to the signal output from said light-detecting means, and outputting an output ratio signal corresponding to the distance to the object;

integrating means for accumulating and integrating the output ratio signal, and outputting an integrated signal corresponding to integration of the output ratio signal;

adjusting means for adjusting a period of each accumulating operation and the number of accumulating operations in said integrating means such that an integration time, a sum of respective periods of the accumulating operations, lies within a range including a fixed value; and detecting means for detecting the distance to the object according to the integrated signal output from said integrating means in conformity with a converting expression for a case where the integration time in said integrating means is at the fixed value.

7. The rangefinder apparatus according to claim 6, wherein said light-projecting means is an infrared light-emitting diode.

8. The rangefinder apparatus according to claim 6, wherein said light-receiving means outputs a near-side signal and a far-side signal.

9. The rangefinder apparatus according to claim 6, wherein said arithmetic means and said integrating means are part of a single autofocus integrated circuit.

10. The rangefinder apparatus according to claim 6, wherein said adjusting means adjusts the integration time in said integrating means to one of a plurality of values and employs an average value of the plurality of values as if the fixed value.

* * * * *